(12) United States Patent
Li (10) Patent No.: US 9,706,860 B2
(45) Date of Patent: Jul. 18, 2017

(54) DISH CONVEYING DEVICE USED IN CATERING STORE

(71) Applicant: Ping Li, Foshan (CN)

(72) Inventor: Ping Li, Foshan (CN)

(73) Assignee: Ping Li, Foshan (CN)

( * ) Notice: Subject to any disclaimer, the term of this patent is extended or adjusted under 35 U.S.C. 154(b) by 0 days.

(21) Appl. No.: 15/103,341

(22) PCT Filed: Oct. 27, 2014

(86) PCT No.: PCT/CN2014/089537
§ 371 (c)(1),
(2) Date: Jun. 10, 2016

(87) PCT Pub. No.: WO2015/085834
PCT Pub. Date: Jun. 18, 2015

(65) Prior Publication Data
US 2016/0286987 A1  Oct. 6, 2016

(30) Foreign Application Priority Data

Dec. 13, 2013  (CN) .......................... 2013 1 0681240
Dec. 13, 2013  (CN) .......................... 2013 1 0686926
Dec. 13, 2013  (CN) .......................... 2013 1 0689895
Aug. 26, 2014  (CN) .......................... 2014 1 0424454

(51) Int. Cl.
*B65G 17/20* (2006.01)
*A47F 10/06* (2006.01)
*B65G 35/06* (2006.01)
*B65G 47/36* (2006.01)

(52) U.S. Cl.
CPC .............. *A47F 10/06* (2013.01); *B65G 35/06* (2013.01); *B65G 47/36* (2013.01)

(58) Field of Classification Search
CPC .... B65G 17/20; B65G 19/025; B65G 17/323; A47F 10/06; A47F 11/0007
USPC .................. 198/465.4, 678.1; 186/47, 48, 50
See application file for complete search history.

(56) References Cited

U.S. PATENT DOCUMENTS

| | | | | |
|---|---|---|---|---|
| 1,606,627 A * | 11/1926 | Gromer | ................... | A47F 10/06 186/47 |
| 3,102,607 A * | 9/1963 | Roberts | .................. | B61D 37/00 186/40 |
| 4,019,605 A * | 4/1977 | Kropf | ....................... | B66B 9/00 186/48 |
| 4,408,687 A * | 10/1983 | Bartsch | .............. | B65G 47/8861 198/464.4 |
| 5,113,970 A * | 5/1992 | Bavis | ...................... | A47F 10/06 186/41 |
| 6,450,318 B1 * | 9/2002 | Minardi | .................. | B66C 11/06 198/346.3 |
| 6,675,950 B1 * | 1/2004 | Collon | .................... | A47F 10/06 186/49 |

(Continued)

*Primary Examiner* — James R Bidwell
(74) *Attorney, Agent, or Firm* — CMB Patent Consulting, LLC (57) ABSTRACT

It discloses a dish sending device for restaurant, comprising: a suspended guide rail, traveling trolley provided on the guide rail, lifting mechanism provided on the travelling trolley; a dish container connection device is provided at the lower end of the lifting mechanism; a trolley sliding contact line is provided on the guide rail, and the travelling trolley is provided with a carbon brush for contact with the trolley sliding contact line.

20 Claims, 8 Drawing Sheets

(56) References Cited

U.S. PATENT DOCUMENTS

| | | | |
|---|---|---|---|
| 2003/0075415 A1* | 4/2003 | Ito | B65G 17/20 198/465.4 |
| 2004/0089518 A1* | 5/2004 | Irish | B65G 1/127 198/678.1 |
| 2005/0279613 A1* | 12/2005 | Ufland | B65G 17/20 198/465.4 |

* cited by examiner

DISH CONVEYING DEVICE USED IN CATERING STORE

This application is the U.S. national phase of International Application No. PCT/CN2014/089537 filed on 27 Oct. 2014 which designated the U.S. and claims priority to Chinese Application Nos. 201310686926.6 filed on 13 Dec. 2013; 201310689895.X filed on 13 Dec. 2013, 201310681240.8 filed on 13 Dec. 2013, 201410424454.1 filed on 26 Aug. 2014 the entire contents of each of which are hereby incorporated by reference.

TECHNICAL FIELD

The present invention relates to the technical field of mechanical sending device, particularly to a dish sending device for restaurant.

BACKGROUND ART

Currently, dish sending work is mostly done manually at the restaurants, which requires a lot of service staff; meanwhile, the work efficiency is limited, and the labor costs are high. With the popularity of buffet restaurants, there are higher requirements for the comfort of restaurants, and more and more restaurants start to use automatic dish sending devices.

In the prior art, common automatic dish sending devices are mainly of: mechanical chain type, conveyor belt type and flume type. In general, the automatic dish sending devices of conveyor belt type and water trough type shake easily during dish sending, and it is difficult for such devices to send food containing soup. A Chinese patent (Publication No. CN203226584U) discloses an automatic dish sending equipment with trolley and track, comprising a dish sending trolley, dedicated trolley track, trolley stop and lifting equipment and master control computer, wherein the trolley stop and lifting equipment is provided on the dedicated trolley track, and the master control computer guides the dish sending trolley to travel along the dedicated trolley track through instructions, and controls the operation of the trolley stop and lifting equipment. However, although these existing dish sending systems can save labor costs and space to some extent, they have to operate on the floor, and floor space can not be fully released; in addition, there is a risk of cross-contamination due to the influence of personnel activity, and the sanitation is unsatisfactory.

DISCLOSURE OF THE INVENTION

Technical Problem

With respect to the problems in the prior art, the objective of the invention is to provide a dish sending device for restaurant which does not occupy floor space and operates stably during dish sending.

Solution to the Problems

Technical Solution

To achieve the said objective, the present invention adopts the following technical solution.

A dish sending device for restaurant, characterized in that it comprises: a suspended guide rail, traveling trolley provided on the guide rail, lifting mechanism provided on the travelling trolley; a dish container connection device is provided at the lower end of the lifting mechanism.

As a further illustration of the above solution, a trolley sliding contact line is provided on the guide rail, and the travelling trolley is provided with a carbon brush for contact with the trolley sliding contact line.

As another illustration of the above solution, the said lifting mechanism comprises: a plurality of connecting rods, whose ends are connected sequentially to form a connecting rod group, and there is an angle adjustable structure between two adjacent connecting rods.

As yet another illustration of the above solution, the said angle adjustable structure means: the ends of the adjacent rods are connected by a hinge, and the lower end of the connecting rod group is connected with at least one pull rope to drive the lifting of the connecting rod group;

Or the said angle adjustable structure means: the adjacent connecting rods are connected by an engaging gear unit, and the gear unit is connected with a drive motor, and the size of the angle between two adjacent connecting rods is controlled by the drive motor.

As still another illustration of the above solution, the said pull rope adopts a concealed structure, that is, the upper or lower side of the connecting rods is provided with a leading wire wheel, and the said pull rope is laid along the inner side of the connecting rods; the upper or lower side of the connecting rods is also provided with a leading wire groove, the leading wire wheel is provided in the leading wire groove, and the pull rope is completely concealed in the leading wire slot.

As a further illustration of the above solution, the said pull rope comprises: the first pull rope which is provided on the second connecting rod counted from the bottom up and is used to drive the lifting of the connecting rod group, and the second pull rope which is provided between the lowermost two adjacent connecting rods.

As another illustration of the above solution, the lowermost two adjacent rod connecting rods of the connecting rod group are arranged to be a mutually rotatable manipulator structure, that is, the lowermost two adjacent connecting rods form a rotatably connected structure via a rotating shaft, and the motor is used to control the rotation angle between the lowermost two adjacent rod connecting rods.

As yet another illustration of the above solution, the said connecting rod group is installed on the traveling trolley and they can rotate with each other.

As still another illustration of the above solution, the said lifting mechanism comprises: a lifting motor, rope retraction wheel connected to the lifting motor, and at least one pull rope connected with the rope retraction wheel; a dish container connection device is provided at the lower end of the pull rope.

As a further illustration of the above solution, there is one pull rope, and the said dish container connection device is a weight balancer, that is, the weight of the dish container connection device is greater than that of the dish container.

As another illustration of the above solution, there are at least three pull ropes, and a plurality of pull ropes and the connecting point of the dish container connection device constitute a lifting area; after connection with the dish container, the center of gravity of the dish container connection device is orthographically projected in the lifting area.

As yet another illustration of the above solution, the said pull rope is a thin wire rope, which passes through the main concave pulley and is connected with the rope retraction wheel; the diameter of the said thin wire rope does not exceed 3 mm.

As still another illustration of the above solution, at least one extendable rod is provided between the dish container connection device and the travelling trolley.

As a further illustration of the above solution, the said extendable rod is a hollow pipe, and the said dish container connection device comprises a lifting plate connected with the bottom of the hollow extendable pipe; the said pull robe passes through the hollow extendable pipe from its upper end and gets out from its lower end, and connects with the lifting plate.

As another illustration of the above solution, the said hollow extendable pipe is replaced with an extendable hose, and the said extendable hose comprises: an elastic liner and rigid rings clamped inside the elastic liner.

As yet another illustration of the above solution, there are two extendable rods, which are connected with the middle part of the dish container connection device at one end, and connected with the travelling trolley at the other end.

As still another illustration of the above solution, the said dish sending device for restaurant further comprises a decorative shell surrounding the lifting mechanism, and the decorative shell is flying saucer-shaped, and LED lights are provided and arranged in at least one circle around the decorative shell.

As a further illustration of the above solution, the said dish container connection device is a lifting plate with a hook or locking device; or the said dish container connection device is a manipulator with at least three movable fingers.

As another illustration of the above solution, the said locking device comprises: a lock catch provided at the end of the lifting plate, a spring driving the lock catch to lock, and an electromagnet driving the lock catch to unlock; or the locking device of the locking mechanism comprises: a micro-motor and lock catch, and the said micro-motor controls the lock catch to reciprocate through a rack driving device, so as to achieve locking and unlocking.

As yet another illustration of the above solution, the said hook device is a latch or hook secured in the center position of the bottom of the lifting plate.

BENEFITS OF THE INVENTION

Benefits

This invention provides a dish sending device for restaurant, which has the following benefits:

First, the travelling trolley, lifting mechanism and dish container connection device are used to achieve dish sending, and additional dish sending staff are not required in the entire process of dish sending to save labor costs. Meanwhile, as the guide rail is suspended, the travelling trolley neither occupies floor space, nor contacts customers, ensuring small floor space occupancy, cleanness and sanitation. In addition, a trolley sliding contact line is installed on the guide rail, and a carbon brush is used to connect the travelling trolley with the trolley sliding contact line, so as to avoid the use of connecting wire and facilitate cyclic operation of the travelling trolley.

Second, the lifting mechanism uses a connecting rod group, and the dish container is very stable in the lifting process; meanwhile, as the connecting rod group is fixed onto a rotary base, the angle between two adjacent connecting rods is adjustable, so as to facilitate the user to adjust the position of the dish container according to actual needs, and ensure high practicality.

Third, the lifting mechanism uses a fork stabilizing mechanism, which effectively avoids the shaking of the dish container in the process of lifting and ensures very stable dish sending.

Fourth, the lifting mechanism simply uses a pull rope, and a dish container connection device is provided at the lower end of the pull rope, so that the structure is simple and the manufacturing cost is low. Meanwhile, the weight of the dish container connection device is greater than that of the dish container, so as to ensure the smooth lifting of the dish container.

Fifth, the lifting mechanism uses extendable rod and pull rope to jointly control lifting movement, so as to effectively prevent the dish container connection device from tilting and shaking in the lifting process. Meanwhile, as the pull rope is a thin wire rope not larger than 3 mm in diameter, the rope is almost invisible under lighting, and does not affect the overall visual effect of the lifting mechanism.

Particularly, as the extendable rod is a hollow extendable rod, the entire pull rope is enclosed by the hollow extendable rod without exposure, so as to improve the appearance of the entire lifting mechanism.

EXPLANATION OF SYMBOLS IN THE DRAWINGS

1. Guide rail, 2. Travelling trolley, 3. Lifting mechanism, 4. Dish container, 5. Shell, 6. Lock mechanism, 7. Extendable rod;

21. Trolley body plate, 22. Travelling motor;

31. Rotary base, 32. Connecting rod, 33. Lifting plate, 34. First pull rope, 35. First rope retraction wheel, 36. Second pull rope, 37. Second rope retraction wheel, 38. Rotating shaft, 39. Leading wire wheel;

310. Lifting motor, 311. Fork stabilizing mechanism, 312. Rope retraction wheel, 313. Grip;

51. Light source;

61. Lock catch;

81. Elastic liner, 82. Rigid ring.

DETAILED DESCRIPTION OF THE PREFERRED EMBODIMENTS OF THE INVENTION

Preferred Mode of Carrying Out the Invention

To facilitate those of ordinary skill in the art to better understand the nature of this invention, specific embodiments of this invention will be described below in detail with reference to the accompanying drawings.

Embodiment 1

Figure 1:
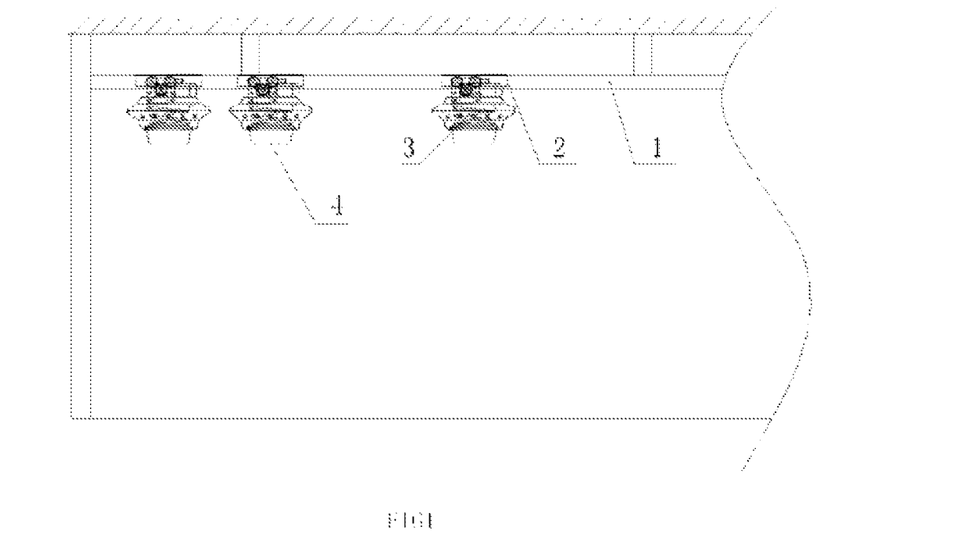
FIG. 1 shows the overall structural diagram of the dish sending device of the invention.

As shown in FIG. 1, a dish sending device for restaurant, comprising: a suspended guide rail 1, a traveling trolley 2 provided on the guide rail 1, a lifting mechanism 3 provided on the travelling trolley 2, and a dish container 4 connected with the lifting mechanism 3. A trolley sliding contact line is provided on the guide rail 1, which provides operating voltage for the travelling trolley, and the said travelling trolley 2 contacts the trolley sliding contact line via a carbon brush. In other embodiments, the trolley sliding contact line and the guide rail are separately arranged in parallel, or the travelling trolley has its own power supply, and the said description is not limited to this embodiment.

In specific applications, to improve the sending efficiency, each guide rail 1 is provided with a plurality of travelling trolleys 2. In particular, when the said dish sending device is used in a hot pot restaurant, two guide rails 1 can be arranged in parallel, one can be used for sending dishes, and the other one can be used for sending hot pot seasoning. At the same time, in order to send as many dishes as possible each time, the said dish container is provided with a portable isolation plate, vegetable dishes can be placed under portable isolation plate, and meat dishes can be placed on the portable isolation plate.

Figure 2:
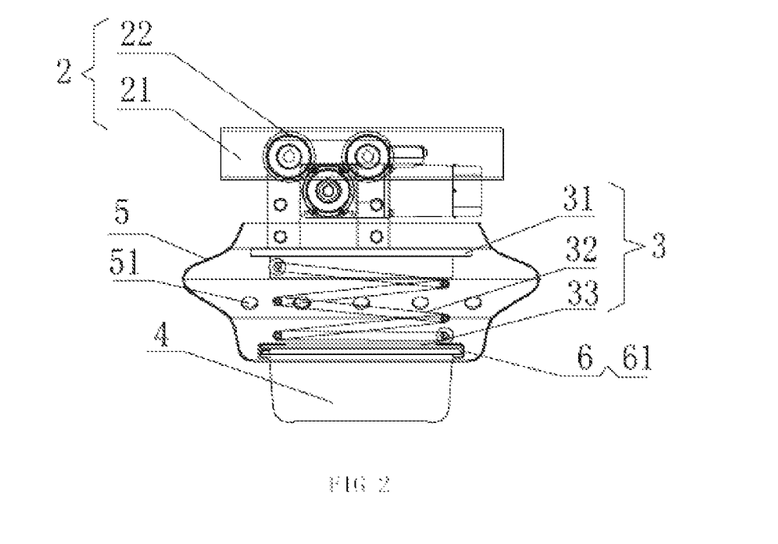
FIG. 2 shows the structural diagram of an individual dish sending device in Embodiment 1 of the invention.

As shown in FIG. 2, the said travelling trolley 2 comprises: a trolley body plate 21 and travelling wheel and travelling motor 22 installed on the trolley body plate 21, the said travelling motor 22 is connected with a reduction gearbox and a frequency transformer controlling the travelling speed of the travelling trolley, the rotating shaft of the travelling motor 22 meshes with the travelling wheel via the drive gear. A shell 5 surrounding the lifting mechanism 3 is installed at the bottom of the travelling trolley 2, the said shell 5 is flying saucer-shaped, and a plurality of light sources 51 are provided on the shell 5. When the travelling trolley 2 or the lifting mechanism 3 operates, the light sources 51 illuminate cyclically to achieve a fantastic decorative effect.

In this embodiment, the travelling motor 22 adopts a 220V right angle 200 W brake gear motor, the drive gear adopts a high-carbon steel hardened gear, and the surface of the travelling wheel is covered with a wear-resistant rubber layer. Thus, the noise is small when the travelling wheel travels on the guide rail, and the friction between the travelling wheel and the guide rail is increased, so as to facilitate travelling and braking.

As a modified embodiment of the travelling wheel, the travelling wheel adopts a high-carbon steel hardened gear, the travelling surface of the guide rail is also provided with guide rail teeth engaging with the travelling wheel. It is relatively difficult to master the reworking precision and mutual matching degree of the modified embodiment, but it is a useful direction for improvement and is not limited to this embodiment.

Here, the main function of the reduction gearbox is to control the turning speed and speed reduction before braking of the travelling trolley. During normal travelling of the travelling trolley, the travelling motor rotates at a high speed of about 1450 rev/min; when the travelling trolley turns on the guide rail, the PLC control first controls the reduction gearbox to reduce the rotational speed of the travelling trolley, so as to avoid splash of the soup in the dish container during turning; similarly, when the travelling trolley approaches (generally 60-70 cm away from the anchor point) the anchor point, the reduction gearbox also works to ensure accurate positioning. In conjunction with FIG. 3, the said lifting mechanism 3 comprises: a rotary base 31 installed on the traveling trolley 1, a plurality of connecting rods 32 and a lifting plate 33. The ends of a plurality of connecting rods 32 are connected sequentially to form a connecting rod group, the upper end of the connecting rod group is fixed onto the rotary base 31, the lower end of the connecting rod group is connected with the lifting plate 33, and the dish container 4 is connected with the lifting plate 33 through the locking mechanism 6. The ends of the adjacent rods are connected by a hinge, the first pull rope 34 is provided on the second connecting rod counted from the bottom up, the first rope retraction wheel 35 is provided on the rotary base 31, and the other end of the first pull rope 34 is connected with the rope retraction wheel 35. There is an angle adjustable structure between the lowermost two adjacent connecting rods for fine adjustment of the angle between the lowermost two adjacent rod connecting rods. Thus, during actual operation, the length of the first pull rope 34 can be controlled to adjust the angle between two adjacent connecting rods, so as to achieve the lifting of the lifting plate 33. In particular, when there are a plurality of placement points for the placement of the dish container, you just need to adjust the angle between the lowermost two adjacent connecting rods by rotating the rotary base 31, so as to facilitate implementation.

Figure 3:
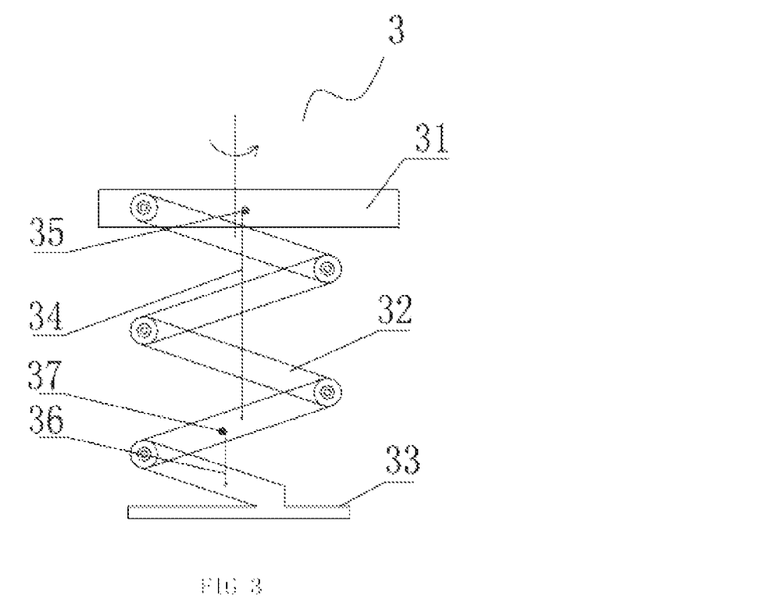
FIG. 3 shows the structural diagram of the lifting mechanism in Embodiment 1 of the invention.

In this embodiment, the said angle adjusting device comprise the second pull rope 36 and the second rope retraction wheel 37, the second rope retraction wheel 37 is installed on the second connecting rod counted from the bottom up, one end of the second pull rope 36 is fixed onto the lowermost connecting rod, and the other end of the second pull rope 36 is connected with the rope retraction wheel. In other embodiments, the said angle adjusting device is replaced with a gear adjusting device, that is, the lowermost two adjacent connecting rods are connected by an engaging gear unit, and the gear unit is connected with a drive motor, and the size of the angle between two adjacent connecting rods is controlled by the drive motor, and the said description is not limited to this embodiment.

Figure 4:
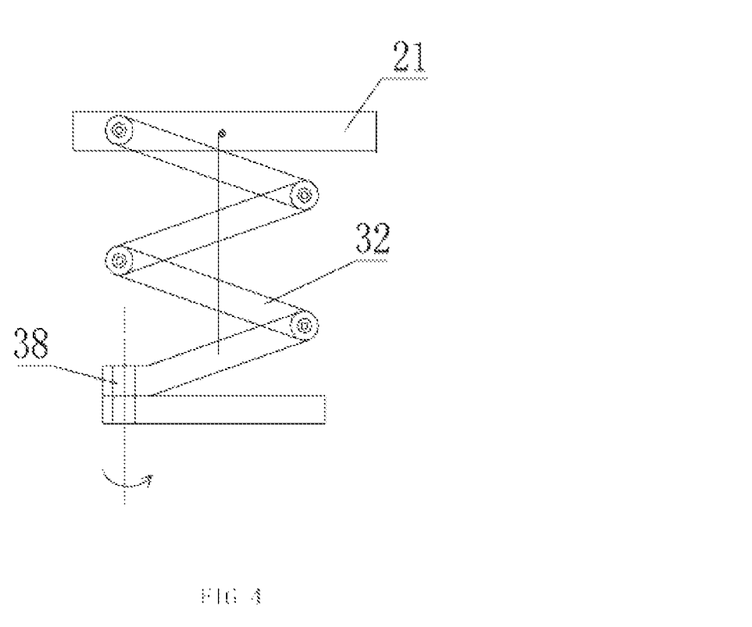
FIG. 4 shows the diagram of an equivalent embodiment of the lifting mechanism.

As shown in FIG. 4, as an equivalent embodiment of the said lifting mechanism, the rotary base is replaced with a non-rotatable trolley body plate 21, and the lowermost two adjacent connecting rods are arranged into a rotatable manipulator structure, for example, the lowermost two adjacent connecting rods form a rotatable connection structure through the rotating shaft 38, and a motor is used to control the rotational angle between the lowermost two adjacent connecting rods; the said description is not limited to this embodiment.

The said locking mechanism 6 comprises: a micro-motor and a lock catch 61, the said micro-motor controls the lock catch 61 to reciprocate through a rack driving device, so as to achieve locking and unlocking. In this embodiment, the lock catch 61 and the micro-motor are installed on the lifting plate 33, and the lock catch is divided into two parts (left part and right part) which match with each other, so as to ensure stable locking of the dish container. As an equivalent embodiment of the locking mechanism, the locking mechanism comprises: a hook, a spring driving the hook to lock the dish container, and an electromagnet driving the hook to unlock the dish container; the said hook, spring and electromagnet are installed on the lifting plate; the lock catch achieves locking and unlocking purposes through the spring and electromagnet. As another equivalent embodiment of the locking mechanism, only one set of electromagnets are used to achieve locking and unlocking of the lock catch, and the said description is not limited to this embodiment.

During actual operation, driven by the travelling motor, the travelling trolley carries the dish container and operates on the guide rail; when the dish container reaches the specified position, the travelling trolley brakes to stop; then, the lifting mechanism operates, and the dish container moves downward by its own gravity; when the dish container reaches the predetermined position, the power of the electromagnet on the locking mechanism is turned on to unlock the locking mechanism and drop down the dish container; then, driven by the lifting motor, the lifting mechanism rises, the power of the electromagnet is turned off, and the locking mechanism locks under the action of the spring; when the lifting mechanism is fully retracted, the power of the lifting motor is turned off, the power of the traveling motor is turned on, and the travelling motor goes back into the kitchen for subsequent dish sending.

Embodiments of the Invention

Mode of Carrying Out the Invention

Embodiment 2

Figure 5:
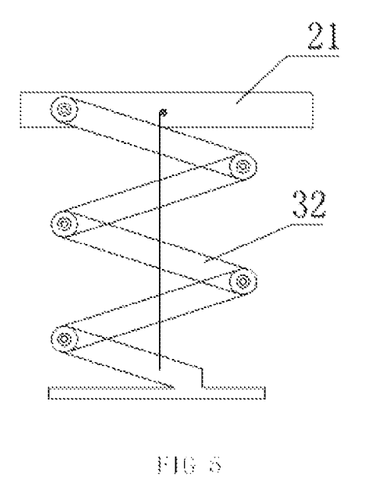
FIG. 5 shows the structural diagram of the lifting mechanism in Embodiment 2 of the invention.

As shown in FIG. 5, a dish sending device for restaurant according to this embodiment, whose structure is basically the same as that of Embodiment 1, and the difference is that the trolley body plate 21 of the travelling trolley is provided with a rope retraction wheel, and a pull rope is provided between the rope retraction wheel and the lowermost connecting rod. During operation, only one pull rope is used to achieve the lifting and falling of a plurality of connecting rods 32.

Embodiment 3

Figure 6:
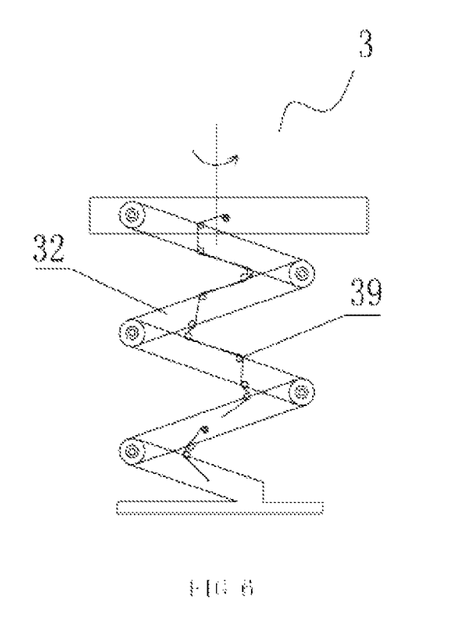
FIG. 6 shows the structural diagram of the lifting mechanism in Embodiment 3 of the invention.

As shown in FIG. 6, a dish sending device for restaurant according to this embodiment, whose structure is basically the same as that of Embodiment 1, and the difference is that the said first pull rope 34 and second pull rope 36 adopt a concealed structure, that is, the upper or lower side of the connecting rods 32 is provided with a leading wire wheel 39, and the said first pull rope 34 and second pull rope 36 are laid along the surface of the connecting rods for better appearance.

Figure 7:
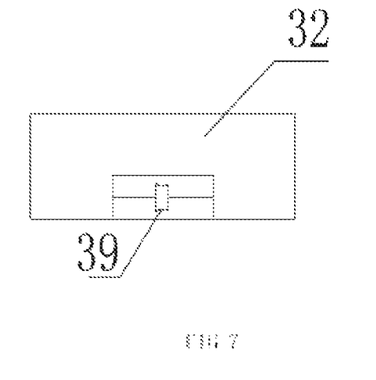
FIG. 7 shows a sectional view of the connecting rod.

As shown in FIG. 7, as an equivalent embodiment, the upper or lower side of the connecting rods 32 is also provided with a leading wire groove, the leading wire wheel 39 is provided in the leading wire groove, and the first pull rope and second pull rope are completely concealed in the leading wire slot for better appearance.

Embodiment 4

Figure 8:
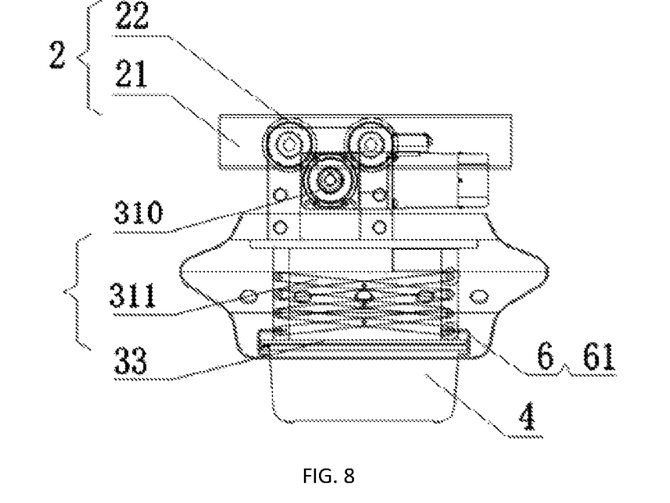
FIG. 8 shows the structural diagram of an individual dish sending device in Embodiment 4 of the invention.
Figure 9:
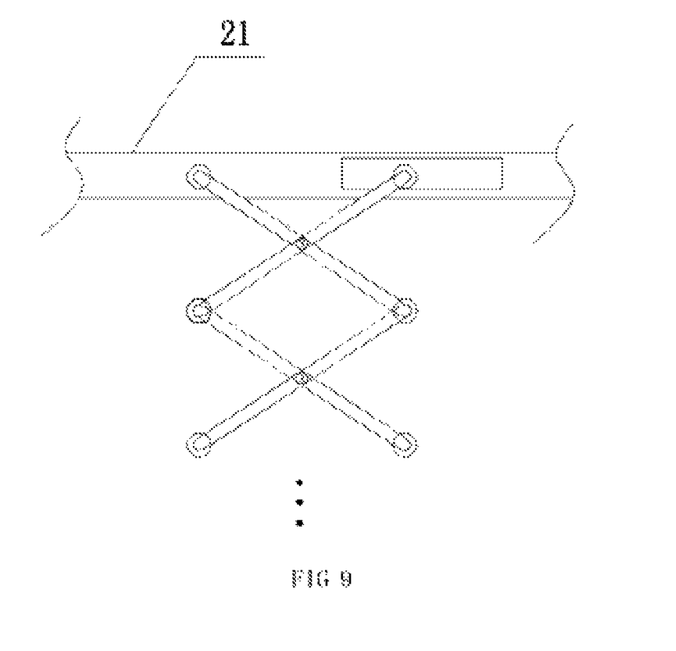
FIG. 9 shows the structural diagram of the lifting mechanism in Embodiment 4 of the invention.

As shown in FIGS. 8 and 9, a dish sending device for restaurant according to this embodiment, whose structure is basically the same as that of Embodiment 1, and the difference is that the said lifting mechanism 3 comprises: a lifting motor 310, pull rope, fork stabilizing mechanism 311 and lifting plate 33. Wherein, the lifting motor 310 is fixed onto the traveling trolley 2, and the lifting rope mechanism comprises: a rope retraction wheel connected with the rotating shaft of the lifting motor 310, two flat ropes connected with the rope retraction wheel and the lifting plate 33, and the fork stabilizing structure 311 connected with the travelling trolley 2 at one end, and connected with the lifting plate 33 at the other end.

Preferably, the said lifting motor is a 220V, 60 W brake gear motor, and the said flat rope is a 30 cm×0.5 cm flat flexible fiber rope. In other embodiments, the said flat rope can be replaced with a rubber belt, and is not limited to this embodiment.

The said fork stabilizing mechanism 311 is a fork group provided at both ends of the lifting plate 33, and the upper end of the fork group is connected with the travelling trolley 2. One of the two connection points between the fork group and the travelling trolley 2 adopts fixed-point rotatable connection, and the other one adopts chute-type movable connection, as shown in FIG. 8. One advantage of this setting is that the lifting height can be controlled only through control of the position of the chute-type connection point of the fork group. Through a lot of experiments, the lifting height error is less than 3 mm, so the positioning accuracy is high.

In this embodiment, each fork group includes three sets of movably connected forks, and each fork is composed of two connecting rods of equal length which are rotatably connected at the midpoint. To ensure the stability of the dish container in the dish sending process, it is preferable that two sets of forks are used and provided on both sides parallel to the running direction of the dish container. Through the structural design of the fork group, shaking of the dish container can be effectively prevented in the dish sending process, especially this anti-shaking design is significant when hot pot seasoning containing soup is conveyed. As a preferred embodiment of the chute-type movable connection, the said chute is also provided with a clasp position and is not limited to this embodiment.

Embodiment 5

Figure 10:
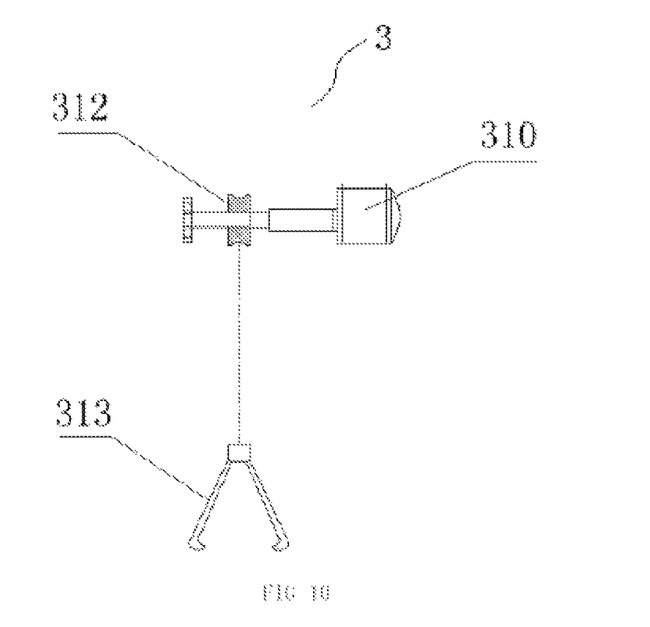
FIG. 10 shows the structural diagram of the lifting mechanism in Embodiment 5 of the invention.

As shown in FIG. 10, a dish sending device for restaurant according to this embodiment, whose structure is basically the same as that of Embodiment 1, and the difference is that the said lifting mechanism 3 comprises: a lifting motor 310, rope retraction wheel 312 connected to the lifting motor 310, and pull rope connected with the rope retraction wheel 312; a grip 313 is provided at the lower end of the pull rope to replace the lifting plate.

The said grip 313 is a weight balancer, that is, the weight of the grip 313 is greater than that of the dish container, so as to ensure the stability of the dish container in the lifting process. In this embodiment, one pull rope is provided, the grip 313 comprises 3 movable fingers of the same shape and weight, and the gravity center of the combination of the three movable fingers lies on the straight line of the pull rope.

In other embodiments, to improve the safety, there are at least three pull ropes, and a plurality of pull ropes and the connecting point of the dish container connection device constitute a lifting area;

after connection with the dish container, the center of gravity of the dish container connection device is orthographically projected in the lifting area; the said grip can be replaced with a hook, ring, balance ball or balance plate; the said description is not limited to this embodiment.

Embodiment 6

Figure 11:
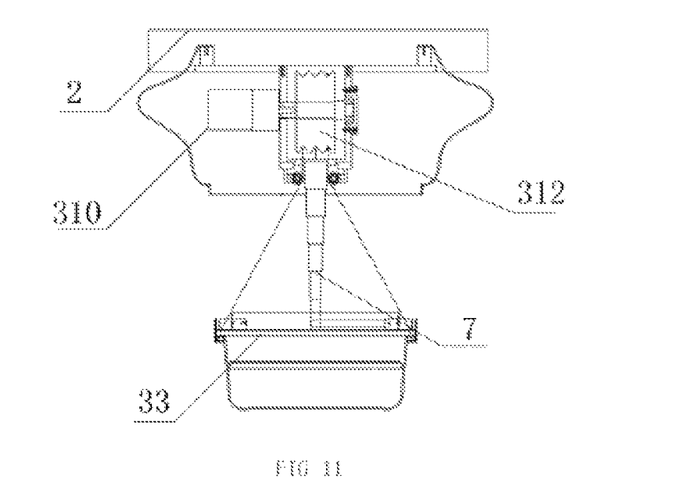
FIG. 11 shows the structural diagram of the lifting mechanism in Embodiment 6 of the invention.

As shown in FIG. 11, a dish sending device for restaurant according to this embodiment, whose structure is basically the same as that of Embodiment 5, and the difference is that:

An extendable rod 7 is provided between the dish container connection device and the travelling trolley 2, so as to control the stability of the dish container connection device in the process of lifting. Preferably, the said dish container connection device is a lifting plate 33.

Wherein, the said pull ropes are six pull ropes arranged circumferentially around the dish container connection device evenly, each pull ropes passes through a concave pulley and is connected with the rope retraction wheel 312 through a common main pulley. The main pulley is provided to prevent entanglement of the pull ropes and ensure smooth retraction.

During actual operation, the dish container connection device and the dish container move down by their own gravity, and move up by the pulling force generated by rope winding when the lifting motor 210 operates. In particular, to prevent fast falling, when the dish container approaches the predetermined position, the lifting motor operates with low power to achieve deceleration.

Embodiment 7

Figure 12:
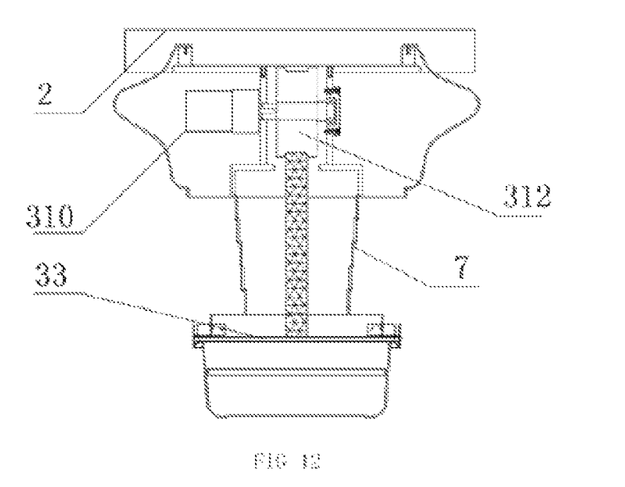
FIG. 12 shows the structural diagram of the lifting mechanism in Embodiment 7 of the invention.

As shown in FIG. 12, a dish sending device for restaurant according to this embodiment, whose structure is basically the same as that of Embodiment 8, and the difference is that:

First, the said extendable rod 7 is a hollow extendable pipe, and the said dish container connection device comprises a lifting plate 33 connected with the bottom of the hollow extendable pipe; the pull robe passes through the hollow extendable pipe from its upper end and connects with the lifting plate 33. Thus, the entire pull rope is enclosed by the hollow extendable rod without exposure, so as to improve the appearance of the entire lifting mechanism.

Second, a plurality of thin wire ropes are replaced with a flexible tape or rope to effectively save the processing cost of the lifting mechanism, and the connection structure is more simple.

Figure 13:
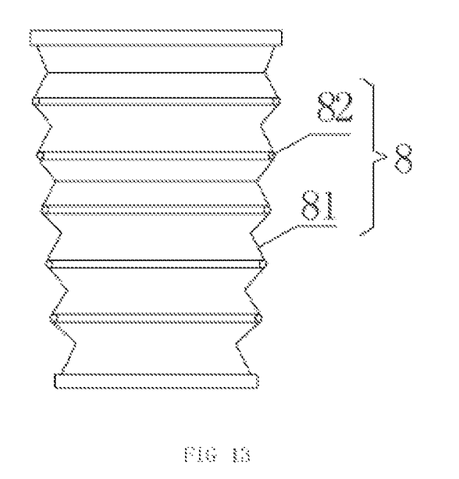
FIG. 13 shows the structural diagram of the extendable hose.

In other embodiments, the said hollow extendable pipe is replaced with an extendable hose 8. As shown in FIG. 13, the said extendable hose 8 comprises: an elastic liner 81 and rigid rings 82 clamped inside the elastic liner 81. Benefits of replacement of the hollow extendable pipe by the extendable hose 8: Prevention of rotation of the dish container connection device, avoidance of twisting or entanglement of the pull ropes (when a plurality of pull ropes are used) inside the extendable hose 8, and smooth lifting.

Embodiment 8

Figure 14:
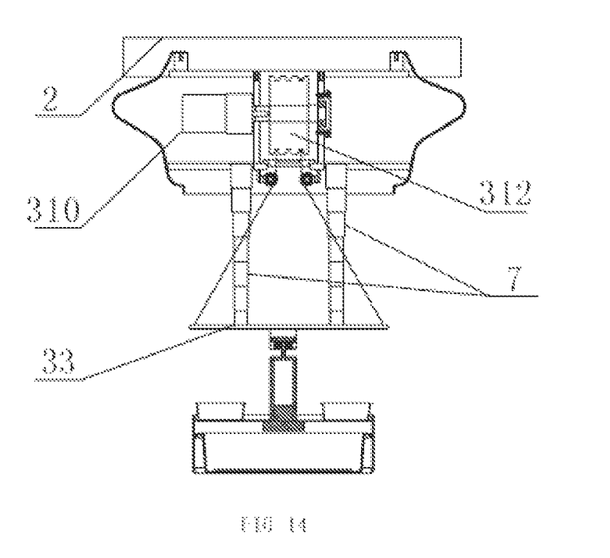
FIG. 14 shows the structural diagram of the lifting mechanism in Embodiment 8 of the invention.

As shown in FIG. 14, a dish sending device for restaurant according to this embodiment, whose structure is basically the same as that of Embodiment 7, and the difference is that:

There are two extendable rods 10, and the said dish container connection device includes a rectangular plate; the two extendable rods 10 are connected with the middle part of the rectangular plate at one end, and connected with the travelling trolley 2 at the other end. When a plurality of pull ropes are used for the lifting and falling of the dish container connection device, the pull ropes get entangled easily, thus affecting the lifting and falling process; the embodiment uses extendable rods to connect with the dish container connection device, so as to avoid rotation of the dish container connection device and ensure better practicality. Furthermore, as the two extendable rods are connected with the middle part of the dish container connection device, the lifting process is very smooth and seizure does not occur easily.

The above specific embodiments describe the essence of this invention in detail, but are not intended to limit the scope of protection of this invention. Obviously, under the revelation of this invention, those of ordinary skill in the art can also make some improvements, such as provision of a guide wheel inside the shell, and installation of the rope retraction wheel outside the shell to improve the utilization of the space inside the shell. All simple improvements, modifications or equivalent transformations in accordance with the essence of this invention shall fall within the scope of protection of the claims of this invention.

What is claimed is:

1. A dish sending device for a restaurant comprises:
a suspended guide rail, a traveling trolley provided on the guide rail, a lifting mechanism provided on the travelling trolley; a dish container connection device is provided at the lower end of the lifting mechanism; wherein,
the lifting mechanism comprises: a plurality of connecting rods, whose ends are connected sequentially to form a connecting rod group, and an angle adjustable structure between two adjacent connecting rods;
the angle adjustable structure consisting of the ends of the adjacent rods are connected by a hinge, and the lower end of the connecting rod group is connected with at least one pull rope to drive the lifting of the connecting rod group; or the angle adjustable structure consisting of the adjacent connecting rods are connected by an engaging gear unit, and the gear unit is connected with a drive motor, and the size of the angle between two adjacent connecting rods is controlled by the drive motor.

2. The dish sending device according to claim 1, characterized in that a trolley sliding contact line is provided on the guide rail, and the travelling trolley is provided with a carbon brush for contact with the trolley sliding contact line.

3. The dish sending device according to claim 1, wherein the pull rope adopts a concealed structure, that is, the upper or lower side of the connecting rods is provided with a leading wire wheel, and the pull rope is laid along the inner side of the connecting rods; the upper or lower side of the connecting rods is also provided with a leading wire groove, the leading wire wheel is provided in the leading wire groove, and the pull rope is completely concealed in the leading wire slot.

4. The dish sending device according to claim 1, wherein the said pull rope comprises: a first pull rope which is provided on a second connecting rod counted from the bottom up and is used to drive the lifting of the connecting rod group, and the second pull rope which is provided between lowermost two adjacent connecting rods.

5. The dish sending device according to claim 4, wherein lowermost two adjacent rods connecting rods of the connecting rod group are arranged to be a mutually rotatable manipulator structure, that is, the lowermost two adjacent connecting rods form a rotatably connected structure via a rotating shaft, and the motor is used to control the rotation angle between the lowermost two adjacent rod connecting rods.

6. The dish sending device according to claim 1, characterized in that the connecting rod group is installed on the traveling trolley and they can rotate with each other.

7. The dish sending device according to claim 1, characterized in that the lifting mechanism comprises: a lifting motor, rope retraction wheel connected to the lifting motor, and at least one pull rope connected with the rope retraction wheel; a dish container connection device is provided at the lower end of the pull rope.

8. The dish sending device according to claim 7, characterized in that there is one pull rope, and the said dish container connection device is a weight balancer, that is, the weight of the dish container connection device is greater than that of the dish container.

9. The dish sending device according to claim 7, characterized in that there are at least three pull ropes, and a plurality of pull ropes and the connecting point of the dish container connection device constitute a lifting area; after connection with the dish container, the center of gravity of the dish container connection device is orthographically projected in the lifting area.

10. The dish sending device according to claim 7, characterized in that the pull rope is a thin wire rope, which passes through the main concave pulley and is connected with the rope retraction wheel; the diameter of the said thin wire rope does not exceed 3 mm.

11. The dish sending device according to claim 7, characterized in that at least one extendable rod is provided between the dish container connection device and the travelling trolley.

12. The dish sending device according to claim 11, characterized in that the extendable rod is a hollow pipe, and the dish container connection device comprises a lifting plate connected with the bottom of the hollow extendable pipe; the pull rope passes through the hollow extendable pipe from its upper end and gets out from its lower end, and connects with the lifting plate.

13. The dish sending device according to claim 12, characterized in that the hollow extendable pipe is replaced with an extendable hose, and the said extendable hose comprises: an elastic liner and rigid rings clamped inside the elastic liner.

14. The dish sending device according to claim 11, characterized in that there are two extendable rods, which are connected with the middle part of the dish container connection device at one end, and connected with the travelling trolley at the other end.

15. The dish sending device according to claim 7, characterized in that at least one fork stabilizing mechanism is provided between the dish container connection device and the travelling trolley; the said fork stabilizing mechanism includes a plurality of forks, which are connected sequentially to form a fork group, and each fork is composed of two connecting rods of equal length which are rotatably connected at the midpoint.

16. The dish sending device according to claim 15, characterized in that the upper end of the fork group is connected with the travelling trolley through two connection points, one connection point adopts fixed-point rotatable connection, and the other connection point adopts chute-type movable connection.

17. The dish sending device according to claim 1, characterized in that it further comprises a decorative shell surrounding the lifting mechanism, and the decorative shell is flying saucer-shaped, and LED lights are provided and arranged in at least one circle around the decorative shell.

18. The dish sending device according to claim 1, characterized in that the dish container connection device is a lifting plate with a hook or locking device; or the dish container connection device is a manipulator with at least three movable fingers.

19. The dish sending device according to claim 18, characterized in that the locking device comprises: a lock catch provided at the end of the lifting plate, a spring driving the lock catch to lock, and an electromagnet driving the lock catch to unlock; or the locking device of the locking mechanism comprises: a micro-motor and lock catch, and the said micro-motor controls the lock catch to reciprocate through a rack driving device, so as to achieve locking and unlocking.

20. The dish sending device according to claim 18, characterized in that the hook device is a latch or hook secured in the center position of the bottom of the lifting plate.

* * * * *